(12) United States Patent
Di Nunno (10) Patent No.: US 10,316,711 B2
(45) Date of Patent: Jun. 11, 2019

(54) INTERNAL COMBUSTION ENGINE COMPRISING A SHIFTING CAM SYSTEM FOR VARIABLE VALVE ACTUATION

(71) Applicant: GM GLOBAL TECHNOLOGY OPERATIONS LLC, Detroit, MI (US)

(72) Inventor: Davide Di Nunno, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 172 days.

(21) Appl. No.: 15/375,968

(22) Filed: Dec. 12, 2016

(65) Prior Publication Data

US 2017/0167325 A1 Jun. 15, 2017

(30) Foreign Application Priority Data

Dec. 10, 2015 (GB) .................................. 1521849.8

(51) Int. Cl.
*F01L 13/00* (2006.01)
*F01L 1/46* (2006.01)
(Continued)

(52) U.S. Cl.
CPC .......... *F01L 13/0036* (2013.01); *F01L 1/462* (2013.01); *F02D 13/0207* (2013.01); *F01L 1/053* (2013.01);
(Continued)

(58) Field of Classification Search
CPC . F01L 13/0036; F01L 1/462; F01L 2013/101; F01L 2105/00; F01L 1/185;
(Continued)

(56) References Cited

U.S. PATENT DOCUMENTS

| 8,863,714 B1* | 10/2014 | Moran ................. F01L 13/0036 |
| | | 123/90.16 |
| 2007/0034184 A1* | 2/2007 | Dengler .................... F01L 1/08 |
| | | 123/90.17 |

(Continued)

FOREIGN PATENT DOCUMENTS

| DE | 102013002368 A1 | 8/2014 |
| DE | 102014212305 A1 | 1/2015 |

OTHER PUBLICATIONS

Great Britain Patent Office, Great Britain Search Report for Great Britain Application No. 1521849.8, dated Jun. 8, 2016.

*Primary Examiner* — Mark A Laurenzi
*Assistant Examiner* — Wesley G Harris
(74) *Attorney, Agent, or Firm* — Lorenz & Kopf, LLP (57) ABSTRACT

An internal combustion engine includes a cam shifting system having a shifting unit rotatably fixed and axially moveable with respect to a camshaft. The shifting unit includes at least two cams configured to be selectively brought in contact with a cam follower and provided with a base circle and with at least one cam lobe. The shifting unit is provided with at least one groove having a shifting portion. A driving pin is operable to be selectively engaged with and disengaged from the shifting portion of the groove. Engagement between the driving pin and the shifting portion of the groove moves the shifting unit with respect to the camshaft. During the movement of the shifting unit the cam follower engages at least a portion of at least one cam lobe.

12 Claims, 6 Drawing Sheets

(51) Int. Cl.
- *F02D 13/02* (2006.01)
- *F01L 1/08* (2006.01)
- *F01L 1/18* (2006.01)
- *F02M 26/05* (2016.01)
- *F02M 26/25* (2016.01)
- *F01L 1/053* (2006.01)

(52) U.S. Cl.
CPC ............... *F01L 1/08* (2013.01); *F01L 1/185* (2013.01); *F01L 2013/0052* (2013.01); *F01L 2013/101* (2013.01); *F01L 2105/00* (2013.01); *F02D 13/0219* (2013.01); *F02M 26/05* (2016.02); *F02M 26/25* (2016.02)

(58) Field of Classification Search
CPC ..... F01L 1/08; F01L 1/053; F01L 2013/0052; F02D 13/0207; F02D 13/0219; F02M 26/25; F02M 26/05
See application file for complete search history.

(56) References Cited

U.S. PATENT DOCUMENTS

| | | |
|---|---|---|
| 2015/0136052 A1 | 5/2015 | Graf |
| 2015/0107540 A1 | 8/2015 | Moon et al. |
| 2015/0233271 A1 | 8/2015 | Popp et al. |

* cited by examiner

INTERNAL COMBUSTION ENGINE COMPRISING A SHIFTING CAM SYSTEM FOR VARIABLE VALVE ACTUATION

CROSS-REFERENCE TO RELATED APPLICATION

This application claims priority to Great Britain Patent Application No. 1521849.8, filed Dec. 10, 2015, which is incorporated herein by reference in its entirety.

TECHNICAL FIELD

The present disclosure pertains to variable actuation of intake and exhaust valves in an internal combustion engine, and more particularly to an internal combustion engine having a cam shifting system for the variable valve actuation.

BACKGROUND

The intake and exhaust valves (collectively referred to as "cylinder valves") of the cylinders of an internal combustion engine are generally controlled by a camshaft. As known, the camshaft is a shaft rotating around a rotation axis and provided with a plurality of cams. Each cam includes one or more lobes protruding from a base circle. Generally, each cylinder valve is coupled to one of the cam of the camshaft, in a cam-follower configuration, so that the rotational movement of the camshaft is transformed into a reciprocating movement of the cylinder valves. In more detail, a cylinder valve is provided with a cam follower that engages a relevant cam of the camshaft, so that, during rotation of the cam, the cam follower is alternatively coupled to the base circle or to the lobe(s) of the cam, thus resulting in a reciprocating movement of the cylinder valve. In such a configuration, the movement of the cylinder valve is the same at every rotation of the camshaft.

However, it may be useful to change the activation of the cylinder valves, and in particular the extent of the lift of the cylinder valve. As an example, in gasoline engines, it is useful to reduce the intake valve lift according to the torque and power demand of the engine (e.g. low intake lift for the low loads and full lift for the partial load).

Various systems are known in the art that achieve this purpose, thus providing a variable valve actuation. One of these systems is known as a cam shifting system, wherein the camshaft is provided with a shifting unit (also known as sliding unit), which is rotatably fixed to the camshaft and slidable along the camshaft rotation axis, i.e. in the direction of extension of the camshaft. The shifting unit is provided with two or more cams preferably controlling each cam follower, and thus each cylinder valve of the internal combustion engine.

Some cams of the shifting unit are provided adjacent one to another so that a cylinder valve, and in particular its cam follower, can be alternatively engaged to different cams. In other words, it is possible to change the cam to which the cam follower, and thus the cylinder valve, is engaged. These different cams have the same base circle, but different distribution and/or configuration of the lobe(s), so that changing the cam to which a cam follower is engaged changes the operation of the cam follower itself.

To carry out the above mentioned changing, the shifting unit is movable along the camshaft, so that the cam follower of the cylinder valve (i.e. the portion of the cylinder valve coupled to the cam) contacts the external surface of a first cam. Due to the movement of the shifting unit in a direction parallel to the rotation axis of the camshaft, the cam follower reaches a position of engagement with the external surface of a second cam. The movement of the shifting unit along the camshaft is known as "shifting movement". This expression will be used herein to indicate the movement of the shifting unit with respect to the camshaft, preferably along the camshaft rotation axis, i.e. along a direction that is parallel, or coincident, with the camshaft rotation axis. The shifting movement of the shifting unit is usually controlled by a driving pin, that engages one or more grooves arranged on the external surface of the shifting unit.

The arc of the external surface of the cams contacted by the cam follower during the shifting movement of the shifting unit must avoid steps. As a result, it is known to carry out the shifting movement of the shifting unit, when the cam follower can be moved from the base circle of a first cam to the base circle of a second cam, so that the cam follower does not encounter an obstacle during the passage from the first cam to a second cam. As a result, considering a 360 rotation degrees of the camshaft, the shifting movement of the shifting unit can be performed only during certain arcs of this rotation.

If these arcs are too short, the available time to carry out the shifting movement is also short, so that the required accelerations would be too high and it would not be possible to use the cam shifting system involving the movement of the shifting unit. This is particularly true when the cams are provided with a plurality of lobes, providing a further reduction of the base circle of the cams available to carry out the shifting movement of the shifting unit.

Accordingly, there is a need to solve the aforementioned drawbacks of the prior art. In particular, there is a need to provide an internal combustion engine including a cam shifting system having an extended time for carrying out the shifting movement of the shifting unit with respect to the known systems.

SUMMARY

An embodiment of the present disclosure provides an internal combustion engine including at least one cylinder having at least one cylinder valve with a cam follower, a rotatable camshaft having a rotation axis for actuating the cylinder valves. The internal combustion engine further includes a cam shifting system having a shifting unit rotatably fixed and axially moveable with respect to the camshaft, the shifting unit including at least two cams (i.e. cam profiles) configured to be selectively brought in contact with a cam follower and provided with a base circle and with at least one cam lobe. The shifting unit is provided with at least one groove, having a shifting portion. The cam shifting system further includes a driving pin operable to be selectively engaged with and disengaged from the shifting portion of the groove. Engagement between the driving pin and the shifting portion of the groove moves the shifting unit with respect to the camshaft along the camshaft rotation axis. In other words, the engagement of the driving pin with the shifting portion of the groove of the shifting unit determines the shifting movement of the shifting unit. The shifting portion is arranged on the shifting unit so that during the movement of the shifting unit along the camshaft rotation axis, the cam follower engages at least a portion of at least one cam lobe.

Advantageously, according to the present disclosure the shifting movement of the shifting unit is performed by the shifting portion of the groove to provide an extended arc, i.e.

an extended surface of the cams, preferably at least two cams, engaged by the cam follower during the shifting movement. In fact, the cam shifting system, and in particular the shifting portion is configured to allow the cam follower to contact at least a portion of the cam lobe of a cam during the movement of the shifting unit.

By doing so, the shifting movement of the shifting unit is carried out not only when the cam follower contacts the base circle of the cams between which it is moved due to the movement of the shifting unit, but also when the cam follower engages, i.e. when it contacts, at least a portion of a cam lobe. Therefore, the time available for performing the shifting movement of the shifting unit can be extended, thus reducing the acceleration to which the cam shifting system, and in particular the driving pin that is engaging the shifting portion of the groove, are subjected.

Advantageously, in the internal combustion engine according to the present disclosure, during the movement of the shifting unit, the cam follower is engaged by at least a portion of the cam lobe to provide a lift of the cylinder valve. In other words, the shifting movement of the shifting unit is carried out also when the cylinder valve is actuated (lifted) due to the engagement of the cam follower with at least a portion of a cam lobe.

According to an embodiment of the present disclosure, the shifting portion of the groove is extending on an arc providing a cam follower shifting path between at least two cams, and the cam follower shifting path includes at least a portion of at least one cam lobe. Advantageously, the cam follower shifting path, i.e. the portion of the surface of the cams contacted (engaged) by the cam follower during the shifting movement of the shifting unit, can include at least a portion of the cam lobe.

The cam follower shifting path can be therefore not limited only to the base circle of the cams of the shifting unit between which the cam follower is engaged, as in the known cam shifting system, but is extended also to at least a portion of the cam lobe. Advantageously, in the internal combustion engine according to the present disclosure, the cam shifting system is configured so that during the shifting movement of the shifting unit, the cam follower engages at least portion of the cam lobe, i.e. a part of the cams outside the base circle, i.e. a part of the cam intended to provide a lift of the cylinder cam.

In fact, according to an embodiment of the present disclosure, the cam follower shifting path includes at least a portion of the base circle of a first cam and at least a portion of the cam lobe of a second cam.

According to an embodiment, during the movement of the shifting unit the cam follower engages at least a portion of two cam lobes of at least two cams. In more detail, the movement of shifting unit provides the engagement of the cam follower with at least two cams, and in particular with two cam lobes of at least two cams.

According to an embodiment of the present disclosure, a cam lobe of a first cam includes a portion arranged at the same distance from the camshaft rotation axis, of a portion of a cam lobe of a different cam, to provide the same lift of the cam follower. The cam follower engages this portion of a cam lobe, during the shifting movement of the shifting unit, i.e. during the movement of the shifting unit along the camshaft rotation axis. The portions of the cam lobes of different cams advantageously form a common surface that can be engaged by the cam follower during the shifting movement of the shifting unit.

In more detail, according to an embodiment of the present disclosure, the portions of at least two cam lobes of two or more cams, preferably of two or more adjacent cams, are arranged at the same distance from the camshaft rotation axis. This expression is used herein to indicate that the portions of the cam lobes of different cams provide the same lift of the cam follower.

The portion of the cam lobe engaged (contacted) by the cam follower during the shifting movement of the shifting unit includes the portion of the cam lobe of a cam arranged at the same distance from the camshaft rotation axis of a portion of a cam lobe of a different cam of the shifting unit. This common surface of two cam lobes of at least two cams of the shifting unit, having the same distance from the camshaft rotation axis, can be advantageously contacted by the cam follower during the shifting movement of the shifting unit. In other words, the cam follower shifting path provided by the shifting portion of the groove of the shifting unit includes a portion of a cam lobe of a cam arranged at the same distance with respect to the camshaft rotation axis, of a portion of a cam lobe of a different cam, to provide the same lift of the cylinder cam.

Advantageously, the engagement of the cam follower during the shifting movement of the shifting unit with a portion of a cam lobe having the same distance from the camshaft rotation axis of another cam lobe of a different cam, provides a movement of the cam follower between at least two cams without undesired steps, and in general without encountering obstacles.

According to an embodiment of the present disclosure, the portion of a cam lobe includes at least part of an opening ramp of the cam lobe. An advantage of this embodiment is to simply perform the shifting movement of the shifting unit while allowing the contact of the cam follower with at least two cams of the shifting unit, when the cam follower is in contact with at least part of an opening ramp of a cam lobe. By doing so, as already mentioned above, the time available to perform the shifting movement of the shifting unit can be extended, preferably outside the base circle of the cams by using a portion of a cam lobe, such as for example an opening ramp of the cam lobe.

According to an embodiment of the present disclosure, the shifting portion of the groove is extending on an arc that is greater than the arc on which the base circle is extending. Advantageously, it provides a shifting movement of the shifting unit while the cam follower is engaging a portion of at least one cam outside the base circle and in particular, as mentioned above, at least a portion of a cam lobe.

According to an advantageous aspect of an embodiment of the present disclosure, the arc on which the base circle extends, is defined by the longest base circle of the at least two cams.

Another aspect of the present disclosure provides a method of controlling the cylinder valve actuation of an internal combustion engine. The internal combustion engine includes at least one cylinder provided with at least one cylinder valve having a cam follower and a rotatable camshaft having a rotation axis for actuating the cylinder valves. The internal combustion engine further includes a cam shifting system having a shifting unit rotatably fixed and axially moveable with respect to the camshaft. The shifting unit includes at least two cams configured to be selectively brought in contact with a cam follower and provided with a base circle and with at least one cam lobe. The shifting unit is provided with at least one groove having a shifting portion. The cam shifting system further includes a driving pin operable to be selectively engaged with and disengaged from the shifting portion of the groove.

The internal combustion engine is operated to rotate the camshaft for activating the at least one cylinder valve of the engine. The driving pin is actuated to engage the shifting portion of the groove to move the shifting unit with respect to the camshaft along the camshaft rotation axis. During movement of the shifting unit along the camshaft rotation axis, the cam follower engages at least a portion of at least one cam lobe of the at least two cams. Advantageously, the method allows a simple and effective variable valve activation by means of the cam shifting system of the internal combustion engine, by performing the shifting movement of the shifting unit due to the engagement of the driving pin with the shifting portion of the groove, when the cam follower is in contact with a cam lobe of the at least two cams of the shifting unit. Therefore, the time available for performing the movement of the shifting unit is advantageously increased. In fact, the shifting movement is performed not only when the cam follower engages the base circle of the cam, but also when it engages at least a portion of the cam lobe of a cam.

As already mentioned above in connection to the internal combustion engine according to the present disclosure, the engagement of at least a portion of the cam lobe performs the shifting movement of the shifting unit when the cylinder valve is lifted due to the engagement of the cam follower with the cam lobe of a cam.

According to an embodiment of the method, during the movement of the shifting unit along the camshaft rotation axis, the cam follower engages at least two cams along a cam follower shifting path. The cam follower shifting path includes at least a portion of at least one cam lobe. The cam follower shifting path is provided by the shifting portion of the groove extending on an arc of the shifting unit. The cam follower shifting path defined by the shifting portion of the groove of the shifting unit can be extended to include at least a portion of a cam lobe of the at least two cams contacted by the cam follower during the shifting movement of the shifting unit.

According to an embodiment of the method, during the movement of the shifting unit along the camshaft rotation axis, the cam follower engages a portion of a cam lobe of a first cam arranged at the same distance from the camshaft rotation axis, of a portion of a cam lobe of a different cam, to provide the same lift of the cam follower. Advantageously, the cam follower can contact two cams of the shifting unit by engaging, during the shifting movement of the shifting unit along the camshaft, a portion of a cam lobe having the same distance from the camshaft rotation axis of a portion of another cam lobe of another cam, preferably of an adjacent cam of the shifting unit.

The portions of the cam lobes of different cams advantageously form a common surface that can be engaged by the cam follower during the shifting movement of the shifting unit. The engagement of a common surface of two lobes of different cams arranged at the same distance from the camshaft rotation axis, provides the engagement of the cam follower with at least two cams during the shifting movement, without encountering obstacles or steps, that may limit the engagement of the cam follower with the cams and providing undesired steps in the lift movement of the cylinder valves.

The method according to one of its aspects can be carried out with the help of a computer program including a program-code for carrying out all the steps of the method described herein, and in the form of computer program product including the computer program. The computer program product may be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described herein are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
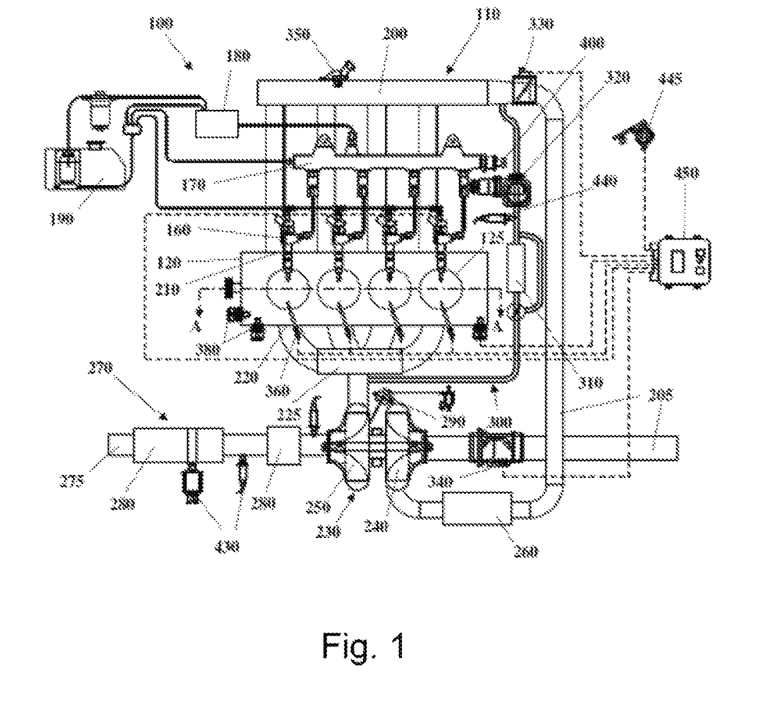
FIG. 1 shows an embodiment of an automotive system including an internal combustion engine.
Figure 2:
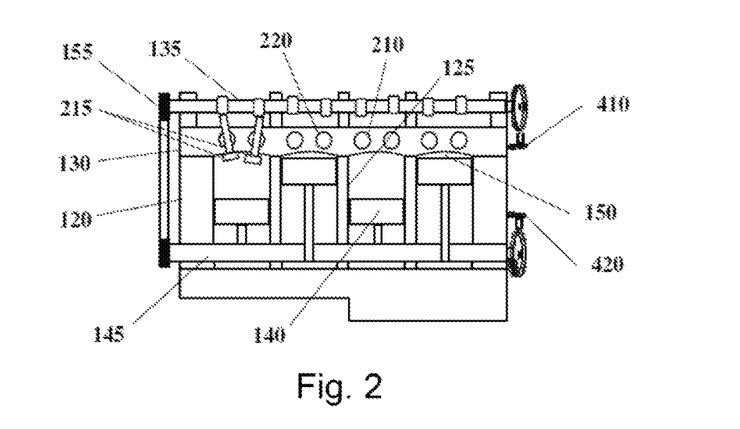
FIG. 2 is a cross-section according to the plane A-A of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a fuel pump 180 that increase the pressure of the fuel received from a fuel source 190. Each of the cylinders 125 has at least two cylinder valves 215, actuated by the camshaft 135 rotating in time with the crankshaft 145. The cylinder valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

Figure 3:
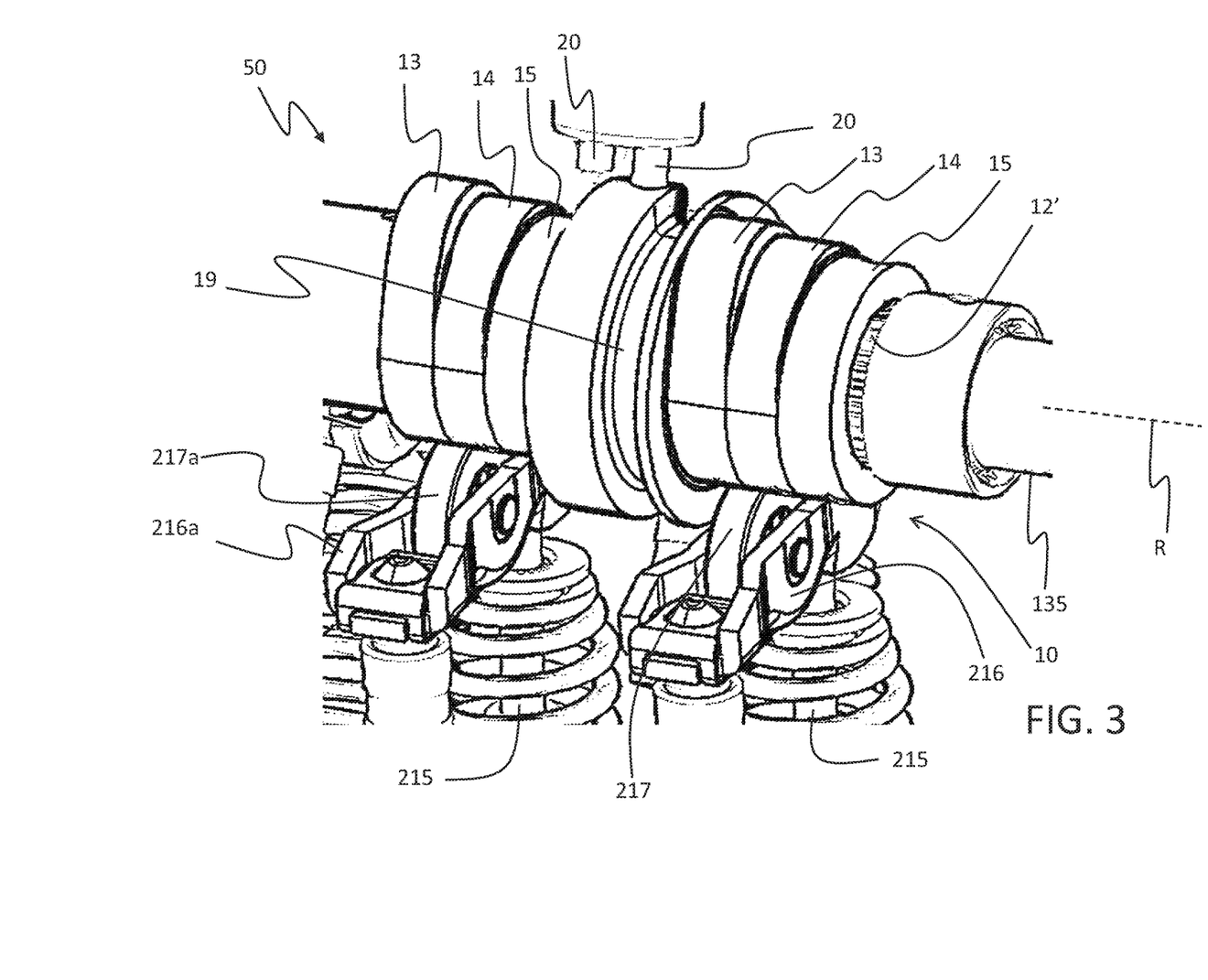
FIG. 3 is a detailed view of an embodiment of a cam shifting system used in an internal combustion engine according to the present disclosure, wherein two cam followers are shown.

In the detailed view of an embodiment shown in FIG. 3, two cylinder valves 215, 215a are partially visible and are provided with a cam follower 216, 216a. The cam follower 216, 216a can be provided with a cam follower roller 217, 217a intended to contact the cams arranged on the camshaft 135, as it will be disclosed in greater detail below. It should be noted that different types of cam follower 216, 216a can be used, such as for example cam followers provided with a rocker arm.

Even if in the embodiments shown in FIGS. 1, 2 and 3, the internal combustion engine 110 can be provided with at least two cylinder valves 215, 215a for each cylinder, e.g. two intake cylinder valves, the present disclosure can be also applied to internal combustion engines provided with one or more cylinder valves for each cylinder.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

With reference to FIGS. 3-7, the internal combustion engine 110 includes a cam shifting system 50 including a shifting unit 10. As for example shown in the figures, the shifting unit 10 can be a hollow element, preferably having cylindrical shape. The shifting unit 10 is coupled rotatably fixed to the camshaft 135. In other words, when the camshaft 135 rotates around a camshaft rotation axis R, the shifting unit 10 rotates together with the camshaft 135. Furthermore, the shifting unit 10 is movable, with respect to the camshaft 135, specifically axially moveable along the camshaft rotation axis R. As mentioned, this axial movement is known as "shifting movement" of the shifting unit 10.

The shifting unit 10 is coupled to the camshaft 135 to be rotatably fixed and axially moveable by mechanisms known in the art. In the shown embodiments, the shifting unit 10 is provided with an internal toothing 12 that meshes with an external toothing 12' of the camshaft 135. Thanks to the toothing engagement 12, 12', the rotational movement of the camshaft 135 is transmitted to the shifting unit 10. Furthermore, the shifting unit 10 can slide on the camshaft 135 along the camshaft rotation axis R. The shifting unit 10 is provided with two or more cams 13, 14, 15 for a cam follower 216, 216a.

According to an embodiment, the shifting unit 10 includes a first cam 13 provided with a first cam base circle 13a and with least one first cam lobe 13b, a second cam 14 provided with a second cam base circle 14a and with at least one second cam lobe 14b, 14c. According to an embodiment, the shifting unit also includes a third cam 15. According to an embodiment, as for example shown in FIGS. 3, 4 and 5, the third cam 15 can be only provided with a cam base circle 15a to form a deactivation cam of the shifting unit 10 for the cylinder valve. However, according to possible embodiments, also the third cam 15 can be provided with a cam base circle 15a and with least one cam lobe.

Figure 7:
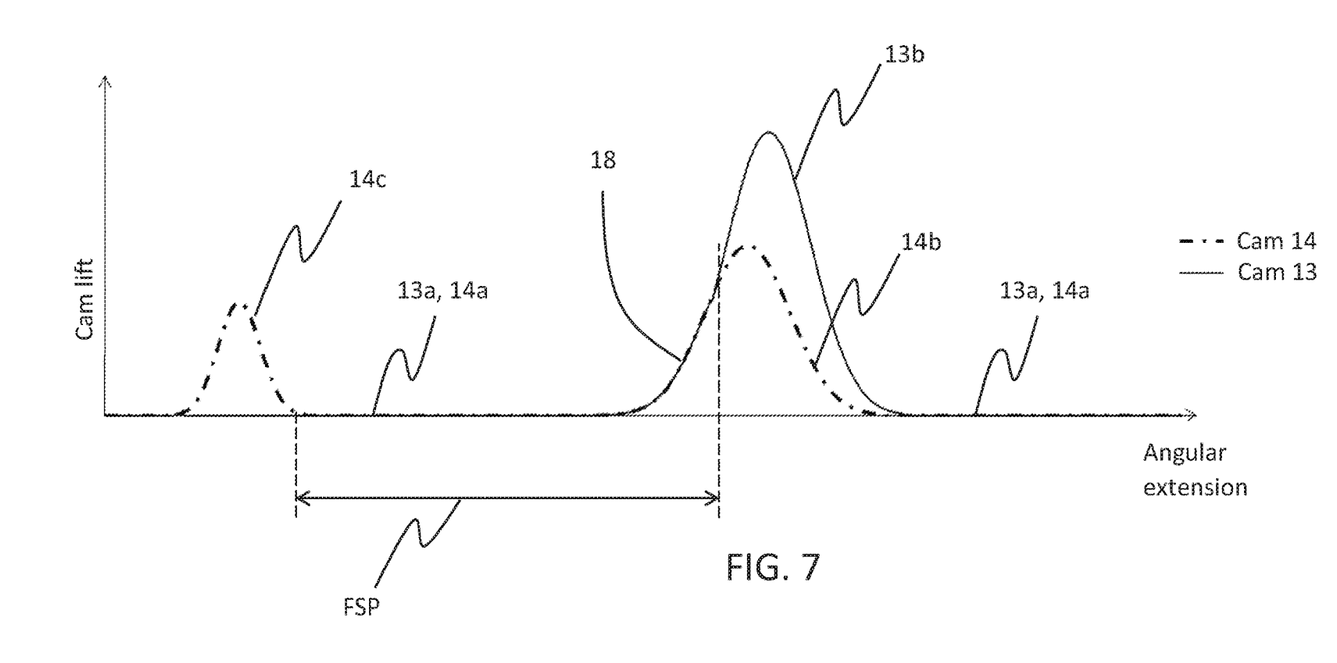
FIG. 7 is a graphic representation of the cams of an embodiment of the cam shifting system used in an internal combustion engine according to the present disclosure.

Cam lobes 13b, 14b, 14c, are for example visible in FIG. 7, that is a graphic showing the shape of the cams along their extension around the camshaft rotation axis R. More in detail, FIG. 7 shown the lift provided by the cams 13 and 14 (on the y-axis (ordinate)) and the extension in a 360 degrees about the camshaft rotation axis R (on the x-axis (abscissa)).

Cam followers 216, 216a are part of relevant cylinder valves 215, 215a. As known, the coupling between the cams 13, 14, 15 and the cam followers 216, 216a transforms the rotational movement of the camshaft into a reciprocating movement of the cylinder valves 215, 215a. Part of the cams is arranged one next to the other. In the shown embodiments, cam 13 is arranged next to cam 14, and cam 15 is arranged next to cam 14. It should be noted that the cams intended to contact the cam followers 216, 216a, are shown in the attached figures with the same reference numbers 13, 14 and 15.

It should be noted that in the following reference will be made to only one cam follower 216 of a cylinder valve 215 intended to contact the at least two cams 13, 14, 15 of the shifting unit 10. What is disclosed in connection to the cam follower 216 can be applied to the other cam followers of the engine, such as for example to the cam follower 216a shown in FIG. 3.

According to an embodiment, as for example shown in FIG. 3, the same shifting unit 10 can be provided with two or more cams 13, 14, 15 for two or more cam followers. For example, in the embodiment shown in FIG. 3, a single shifting unit 10 is provided with two or more cams for the two cam followers 216, 216a. However, according to different possible embodiments, two shifting units can be provided, having two or more cams 13, 14, 15, to engage respectively the cam follower 216 and the cam follower 216a.

Cams 13 and 14 can engage cylinder valve 215, and in particular the cam follower 216. As mentioned above, the following description applies also to cams 13, 14 and 15 intended to be engaged by cam follower 216a of the cylinder valve 215a. Cams 13, 14 and 15 are provided with a base circle 13a, 14a and 15a. Additionally cams 13 and 14 are also provided with lobes 13b, 14b, 14c that protrude from the base circle 13a, 14a. As mentioned above, in the shown embodiment the third cam 15 is a deactivation cam, i.e. cam not providing lift of the cylinder valve, and therefore it is provided only with the base circle 15a. However, according to different possible embodiments, also the third cam 15 can be provided at least one cam lobe.

It should also be noted that, according to possible embodiments, the cam 13, 14, 15 can be provided with a single lobe. In general, according to different embodiments, not shown, the cams 13, 14, 15 may be provided with a different number of lobes. As known, the number and the shape of the cam lobe provides the desired valve actuation. For example, as better shown in FIG. 6, the cam 13 is provided with a single cam lobe 13b. The cam 14 is provided with two cam lobes 14b, 14c, having different distance from the camshaft rotation axis R, i.e. different heights. Therefore, the cam lobes 14b, 14c, provide a different actuation of the cylinder valve 215, and in particular a different lift of the cylinder valve.

As known, when the cam follower 216 of a cylinder valve 215 engages the base circle 13a, 14a 15a of a cam, the cylinder valve is not actuated (not lifted) and preferably maintained in a closed position. On the contrary, when the cam follower 216 engages a cam lobe of a cam, the cylinder valve is lifted and thus opened. The height of the lobe determines the lift of the valve from the closed to the open position. As for example shown in FIG. 7, the base circle corresponds to the portion of the lines not providing a lift, while the cam lobes corresponds to the portion of the lines providing a lift of the cam follower.

According to an embodiment, the base circle 13a of cam 13 has the same diameter of the base circle 14a of cam 14. When provided, also the base circle 15a of the further cam 15 has the same diameter of the other base circles of the other cams 13, 14. The term diameter is used herein to indicate that the base circles 13a, 14a and 15a have the same distance from the camshaft rotation axis R. Preferably the distance is measured along a radial line passing through the camshaft rotation axis R.

According to an embodiment, the at least two cams 13, 14, 15 are provided with at least a portion 18 of the cam lobes 13b, 14b having the same distance from the camshaft rotation axis R. Preferably the distance is measured along a radial line passing through the camshaft rotation axis R. More in detail, a cam lobe 13b of a first cam 13 includes a portion 18 arranged at the same distance from the camshaft rotation axis R, of a portion 18 of a cam lobe 14b of a different cam 14, to provide the same lift of the cam follower 216, 216a. These portions 18 of cam lobes of different cams can be seen for example in the graphic representation of FIG. 7, wherein the portion 18 of the cam lobes 13b, 14b, of cams 13, 14, are partially overlapped, i.e. are arranged at the same distance from the camshaft rotation axis to provide the same lift of the cam follower.

In other words, the at least two cams 13, 14, preferably two adjacent cams, are provided with a portion 18 of a cam lobe that is arranged at the same distance from the camshaft rotation axis R, so as to provide the same lift of the cam follower 216. These portions 18 of at least two lobes 13b, 14b are placed next one the other, and they are arranged at the same distance from the camshaft rotation axis R. In other words, these portions form a common surface of the cams because they provide the same lift of the cylinder valve. As it will be explained subsequently, during the shifting movement of the shifting unit 10, the cam follower 216 engages at least a portion of a cam lobe, and preferably a portion of a cam lobe arranged at the same distance from the camshaft rotation axis of a portion of a cam lobe of another cam.

According to an embodiment, the shifting unit 10 is provided with at least one groove 19. In particular, as for example in the shown embodiment, the internal combustion engine 110 is provided with at least one driving pin 20 that can be selectively engaged and disengaged from the groove 19. In the shown embodiments, see for example FIG. 3, two driving pins 20 are provided. The at least one driving pin 20 is actuated by suitable device, such as for example an actuator controlled by the ECU of the internal combustion engine, so as to be moved from at least a position in which it engages the groove 19 and at least a position in which it is disengaged from the groove 19.

According to an embodiment, at least one driving pin 20 can be selectively extracted and retracted from a body of a suitable actuator, in order to engage/disengage the groove 19. The groove 19 includes a shifting portion 19a, and the driving pin 20 is operable to be selectively engaged with and disengaged from the shifting portion 19a of the groove 19. The engagement between the driving pin 20 and the shifting portion 19a of the groove 19 causes the movement of the shifting unit 10 along the camshaft, i.e. causes the shifting movement of the shifting unit 10.

In fact, the shifting portion 19a is shaped as a helical portion, i.e. as a curved path extending between two points, or portions, arranged at different distances from each other along the extension of the camshaft rotation axis. In other words, the shifting portion 19a is extending to connect points of the shifting unit external surface that are lying on different planes perpendicular to the camshaft rotation axis R. The shifting portion can be left-handed or right handed so that the shifting unit 10 can be moved during the rotation of the camshaft while the driving pin is engaged in the shifting portion 19a of the groove.

Figure 4:
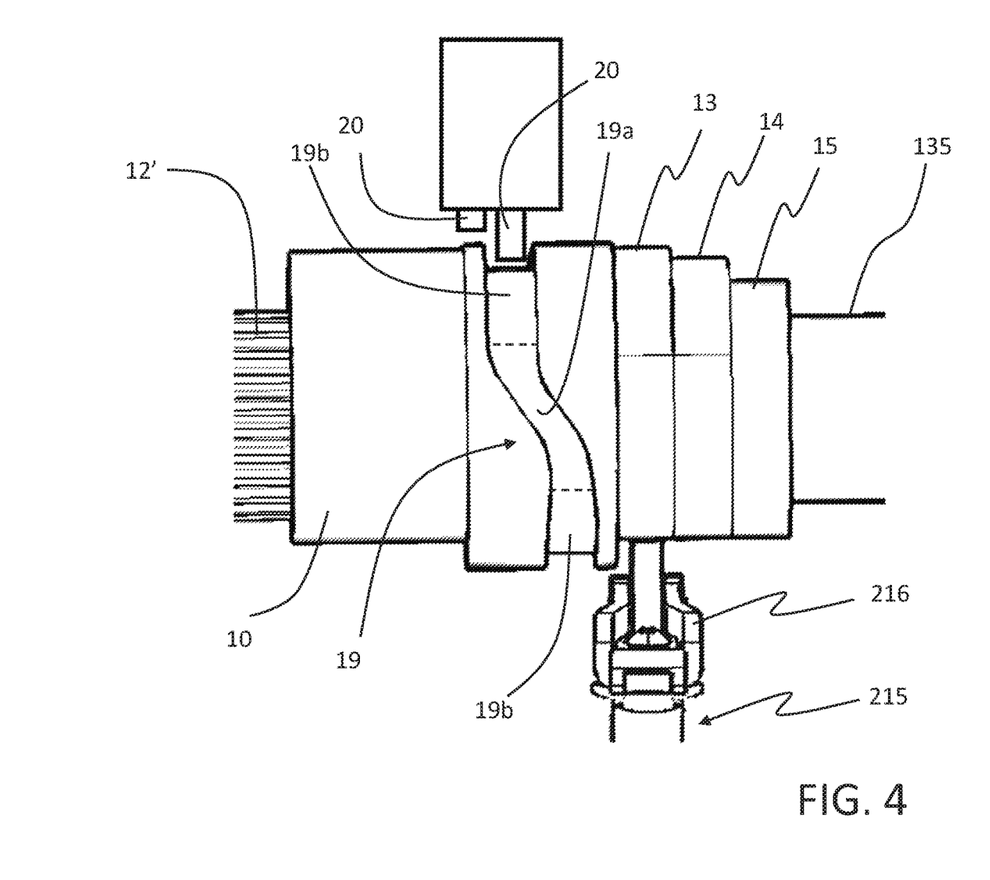
FIG. 4 is schematic view showing a cam follower engaging a cam of the shifting unit, the shifting portion of the groove, and the driving pin.
Figure 5:
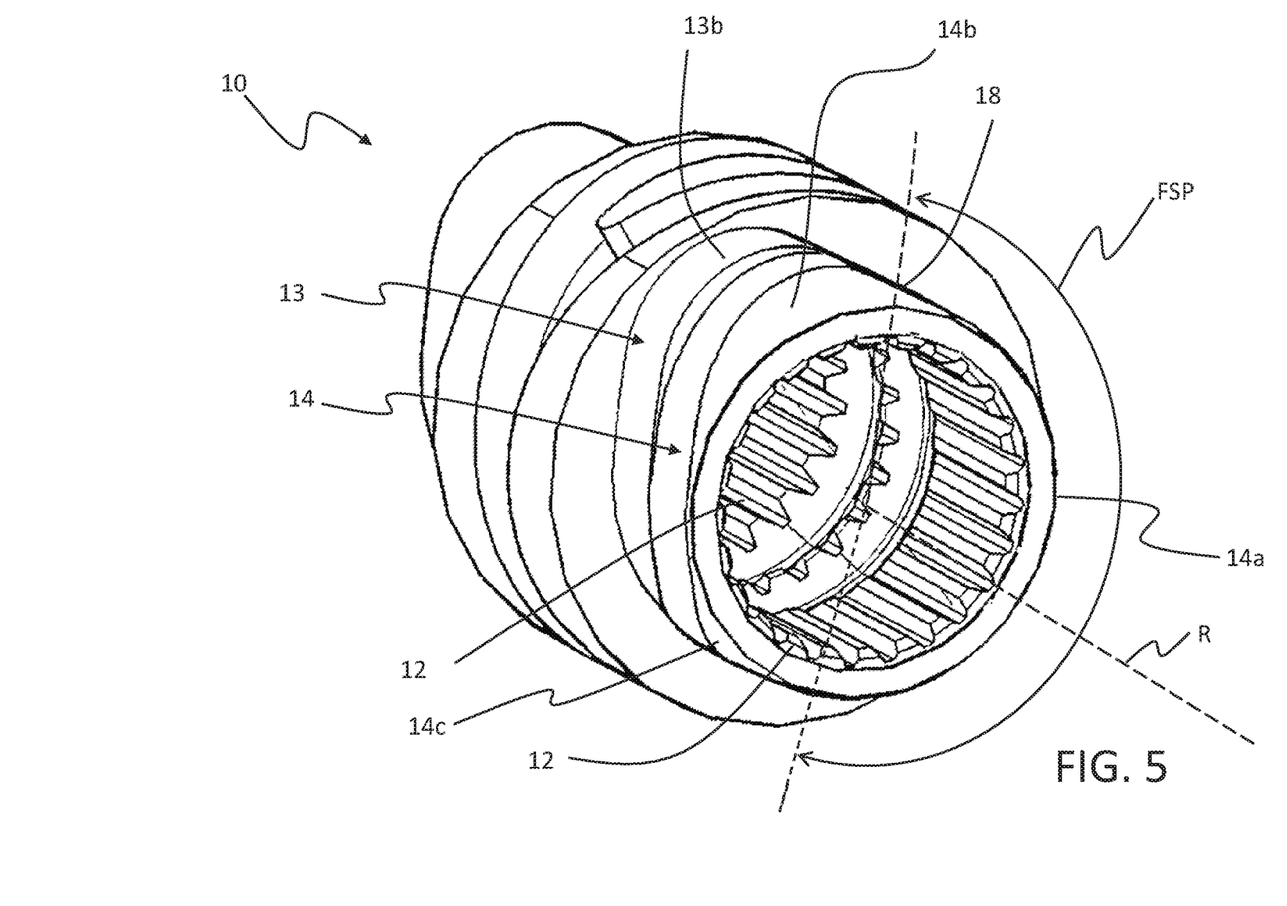
FIG. 5 is a perspective view of an embodiment of the shifting unit according to the present disclosure.

As seen for example in the schematic view of FIG. 4, when the driving pin 20 is operated to engage the shifting portion 19a, the shifting unit 10 is moved along the camshaft. Due to the shifting movement of the shifting unit 10, the cam follower 216 engages at least two different cams. In other words, before starting the shifting movement of the shifting unit the cam follower 216 engages a first cam 13, while at the end of the shifting movement, the cam follower engages a different cam 14.

It should be noted that the shifting portion 19a is shown in a schematic manner and its extension has been reduced to provide a better representation. The shifting portion 19a, i.e. the helical portion, extends between two rectilinear portions 19b of the groove 19 which are extending on two planes perpendicular to the camshaft rotation axis, so that when the driving pin 20 engages the rectilinear portions 19b of the groove 19, the shifting unit 10 is not moved along the camshaft rotation axis.

It should be noted that the shifting unit 10 can be moved along the camshaft, by means of the shifting portion 19a of the groove 19 between at least two positions, corresponding to positions in which the cam follower 216, 216a engages respectively two different cams 13, 14, 15 of the shifting unit 10.

It should be noted that the cam shifting system 50 of the internal combustion engine may include two or more driving pin 20, as for example shown in FIG. 3, so as when different driving pins 20 engages the shifting portion 19a, different movement of the shifting unit 10 along the camshaft rotation axis can be obtained, corresponding to different positions in which the cam follower 216 engages different cams 13, 14, 15. During the movement of the shifting unit along the camshaft rotation axis, i.e. during the shifting movement caused by the engagement of the driving pin 20 with the shifting portion 19a, the cam follower 216, and in particular the cam follower roller 217 engages (contacts) at least two cams 13, 14, 15.

The cam shifting system 50 according to the present disclosure and in particular the shifting portion 19a is configured such that during the shifting movement of the shifting unit 10 along the camshaft rotation axis R, the cam follower 216 engages at least a portion of at least one cam lobe 13b, 14b. In other words, the cam follower engages also the cam lobe of the cam in addition to the cam base circle used in the known cam shifting systems, when the shifting unit is moved along the camshaft to provide the engagement of the cam follower from a first cam to at least one different cam 13, 14, 15.

More in detail, the shifting portion 19a of the groove 19 is extending on an arc A, preferably arranged on the external surface of the shifting unit 10, providing a cam follower shifting path FSP (see for example FIG. 7) between at least two cams 13, 14, 15, and the cam follower shifting path includes at least a portion of at least one cam lobe 13b, 14b. In other words, when the shifting unit is moved along the camshaft, the cam follower 216 is moved between at least two cams 13, 14, i.e. it is moved from a position in which it engages a first cam 13 into a position in which it engages a different cam 14.

Figure 6:
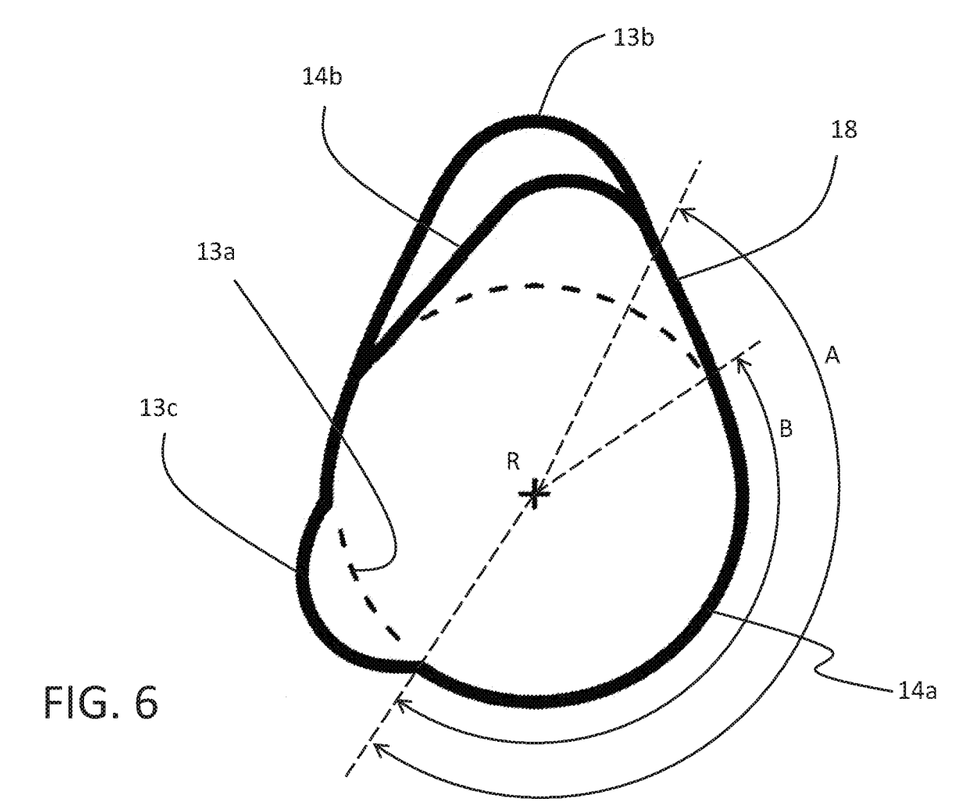
FIG. 6 is a planar schematic view of an embodiment of the shifting unit according to the present disclosure.

According to an embodiment, as for example shown in FIG. 6, the shifting portion 19a of the groove 19 is extending on an arc A that is greater than the arc B on which the base circle 13a, 14a, 15a is extending. The arcs A and B covers angles measured from the camshaft rotation axis R. Advantageously, the shifting portion 19a is extending along the surface of the shifting unit, thus corresponding to an arc of the rotation of the camshaft, that is greater than the extension of the base circle of a cam of the shifting unit. It follows that when the shifting unit is shifted along the camshaft, due to the engagement of the driving pin with the shifting portion 19a, the cam follower engages the base circle and also at least a portion of the cam lobe 13b, 14b.

According to an embodiment, the arc B on which the base circle 13a, 14a, 15a extends, is defined by the longest base circle 13a, 14a, 15a of the at least two cams 13, 14, 15. The cam follower shifting path FSP, also called cam follower shifting window, i.e. the portion of the cams 13, 14, 15 engaged by the cam follower 216 when the shifting unit is moved along the camshaft rotation axis R while it is rotated together with the camshaft, includes a portion of a cam lobe 13b, 14b, 14c (see for example FIG. 7). In other words, the cam follower shifting path FSP represents the surface of the cams contacted by the cam follower during the rotation of the camshaft while the shifting unit is moved along the camshaft due to the engagement of the driving pin 20 with the shifting portion 19a of the groove 19. The cam follower shifting path FSP can be also seen as the arc of the cams contacted by the cam follower, during the rotation of the camshaft while the shifting unit is moved along the camshaft.

As already mentioned above, the contact of the cam follower 216 with a cam lobe of the cam advantageously allows to increase the cam follower shifting path FSP, so that the shifting movement of the shifting unit can be performed in an increased rotation angle of the camshaft, thus increasing the time available to carry out the shifting movement and thus reducing the accelerations involved. Advantageously, according to an embodiment, during the shifting movement of the shifting unit 10 along the camshaft 135, the cam follower 216 can therefore engage at least a portion of the base circle 13a of a first cam 13 and at least a portion of the cam lobe 14b of a second cam 14. According to an embodiment, during the shifting movement of the shifting unit 10, the cam follower 216 engages two cam lobes of at least two different cams.

According to an embodiment, a portion 18 of a cam lobe 13b of a cam 13 is arranged at the same distance from the camshaft rotation axis R, of a portion 18 of a cam lobe 14b of a different cam 14, so as to provide the same lift of the cam follower 216. In other words, portions 18 of cam lobes 13b, 14b, belonging to two different cams 13, 14, preferably belonging to two adjacent cams, are arranged at the same distance from the camshaft rotation axis R. More in detail, the cams 13, 14 have a common surface, on a portion of their cam lobes, arranged at the same distance from the camshaft rotation axis R, so as the same lift of the cam follower, and thus of the cylinder valve 215, can be provided.

Advantageously, according to an embodiment of the present disclosure, during the shifting movement of the shifting unit 10 along the camshaft rotation axis R, the cam follower 216 engages a portion 18 of the cam lobe that is arranged at the same distance with respect to the camshaft rotation axis of a portion 18 of the cam lobe of another cam.

According to an embodiment, during the shifting movement of the shifting unit 10 along the camshaft rotation axis R, the cam follower 216 engages the portions 18 of two cam lobes that are arranged at the same distance with respect to the camshaft rotation axis.

According to an embodiment, the portion 18 arranged at the same distance from the camshaft rotation axis R axis to provide the same lift of the cam follower, includes at least part of an opening ramp of the cam lobe 13b, 14b. In other words, according to an embodiment of the present disclosure, at least a portion of the opening ramp 18 of at least one cam lobe 13b, 14b is contacted (engaged) by the cam follower 216 during the shifting movement of the shifting unit along the camshaft.

According to an embodiment, as for example shown in FIG. 3, the shifting unit 10 can be provided with two or more cams 13, 14, 15 for each cam follower and a single groove 19 provided there between. However, other possible embodiments can be provided, for example by using a single shifting unit having two or more cams and a groove and a relative driving pin, intended to control the movement of the shifting unit, for a single cam follower of the internal combustion engine.

The present disclosure also relates to a method of controlling the cylinder valve actuation of an internal combustion engine 110 provided with a cam shifting system 50 according to the present disclosure. What is disclosed above in connection to the internal combustion engine also applies to the method and vice versa.

The internal combustion engine is operated to rotate the camshaft 135 in order to actuate the at least one cylinder valve. The driving pin 20 is actuated to engage the shifting portion 19a of the groove 19 to move the shifting unit 10 with respect to the camshaft 135 along the camshaft rotation axis R. During the movement of the shifting unit 10 along the camshaft rotation axis R, the cam follower 216, 216a engages a portion 18 of a cam lobe 13b, 14b of a first cam 13, 14, 15 arranged at the same distance from the camshaft rotation axis R, of a portion 18 of a cam lobe 13b, 14b, of a different cam 13, 14, 15 to provide the same lift of the cam follower 216, 216a. It should be noted that the shifting movement of the shifting unit 10 can be performed in order to obtain the desired actuation (lift) of the at least one cylinder valve. Therefore, the engagement/disengagement of the driving pin 20 with the shifting portion 19a of the groove 19 of the shifting unit 10 can be performed, according to the present method, in order to provide the engagement of the at least one cam follower 216, 216a with the desired cam 13, 14, 15 having the desired profile to provide desired cylinder valve lift. The shifting movement of the shifting unit can be performed by means of the ECU 450 of the internal combustion engine controlling the engagement/disengagement of the driving pin 20 with/from the shifting portion 19a.

According to an embodiment, at least one value of at least one operating parameter of the internal combustion engine 110 is monitored during its operation. The at least one operating parameter can include an engine load correlated parameter, measured and/or evaluated by at least one sensor, not shown, eventually in combination with stored data.

Actuation of the driving pin 20 to engage the shifting portion 19a of the groove 19 and to move the shifting unit 10 with respect to the camshaft 135 may be carried out as a function of the monitored value of the at least one operating parameter.

According to a control strategy, the intake valve lift is reduced for the low loads operating conditions of the internal combustion engine, so that the cam follower 216, 216a is brought into contact with a cam 13, 14, 15 having at least a cam lobe providing a low lift of the cylinder valve. Full valve lift can be provided for increased loads operating conditions of the internal combustion engine. Therefore, the cam follower is brought into engagement with a different cam 13, 14, 15 having at least one cam lobe with an increased lift of the cylinder valve. The engagement of the cam follower with a different cam is carried out by causing the shifting movement of the shifting unit 10.

As mentioned above, the cam follower 216 engages at least a portion 18 of a cam lobe during the shifting movement of the shifting unit along the camshaft. In fact, during the movement of the shifting unit 10 along the camshaft rotation axis R, the cam follower 216 engages at least two cams 13, 14, 15 along a cam follower shifting path FSP. The cam follower shifting path includes at least a portion 18 of at least one cam lobe 13b, 14b.

According to an embodiment, the contact of the cam follower with at least two cams of the shifting unit is carried out by contacting a portion of at least two cam lobes of two cams having the same distance from the camshaft rotation axis to provide the same lift of the cylinder valve. In fact, during the movement of the shifting unit 10 along the camshaft rotation axis R, the cam follower 216, 216a engages a portion 18 of a cam lobe 13b, 14b of a first cam 13, 14, 15 arranged at the same distance from the camshaft rotation axis R, of a portion 18 of a cam lobe of a different cam, to provide the same lift of the cam follower 216, 216a. As discussed above in connection to the internal combustion engine, at least a part of an opening ramp 18 of a cam lobe can be engaged by the cam follower during the shifting movement of the shifting unit.

Still another aspect of the present disclosure provides an apparatus for controlling the cylinder valve actuation of an internal combustion engine. The internal combustion engine includes at least one cylinder provided with at least one cylinder valve having a cam follower, a rotatable camshaft having a rotation axis for actuating the cylinder valve. The internal combustion engine further includes a cam shifting system including a shifting unit rotatably fixed and axially moveable with respect to the camshaft. The shifting unit includes at least two cams configured to be selectively brought in contact with a cam follower and provided with a base circle and with at least one cam lobe wherein the shifting unit is provided with at least one groove having a shifting portion. The cam shifting system further includes a driving pin operable to be selectively engaged with and disengaged from the shifting portion of the groove.

The apparatus is configured to operate the internal combustion engine to rotate the camshaft for activating the cylinder valve of the engine, and actuate the driving pin to engage the shifting portion of the groove to move the shifting unit with respect to the camshaft along the camshaft rotation axis. During the movement of the shifting unit along the camshaft rotation axis, the cam follower engages at least a portion of at least one cam lobe of the at least two cams.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A cam shifting system of an internal combustion engine including at least one cylinder provided with at least one cylinder valve having a cam follower, the cam shifting system comprising:
    a rotatable camshaft rotatable about a camshaft rotation axis for actuating the cylinder valve;
    at least two cams configured to selectively contact with the cam follower, each cam having a base circle and a cam lobe, wherein the at least two cams have a common surface between the base circle and the cam lobe of each cam for providing an opening ramp to lift the cam follower; and
    a shifting unit rotatably fixed and axially moveable with respect to the camshaft, the shifting unit having at least one groove with a shifting portion, and a driving pin operable to selectively engage with the shifting portion of the groove;
    wherein engagement between the driving pin and the shifting portion of the groove moves the shifting unit along the camshaft rotation axis with respect to the camshaft;
    wherein the shifting portion is arranged on the shifting unit so that during the movement of the shifting unit along the camshaft rotation axis the cam follower engages at least a portion of the common surface.

2. The cam shifting system according to claim 1, wherein the shifting portion of the groove is extending on an arc providing a cam follower shifting path between the at least two cams, said cam follower shifting path comprising at least a portion of the common surface.

3. The cam shifting system according to claim 1, wherein the shifting portion of the groove is extending on a first arc on which said base circle and said common surface are extending that is greater than a second arc on which said base circle is extending.

4. The cam shifting system according to claim 3, wherein the second arc on which the base circle extends is defined by the longest base circle of the at least two cams.

5. The cam shifting system according to claim 1, wherein a cam follower shifting path comprises at least a first portion of the base circle of a first cam and at least a second portion of the common surface.

6. The cam shifting system according to claim 1, wherein the shifting unit comprises a first cam having a first cam base circle and at least one first cam lobe, a second cam having a second cam base circle and at least one second cam lobe, and a third cam.

7. A method of controlling the cylinder valve actuation of an internal combustion engine including at least one cylinder provided with at least one cylinder valve having a cam follower, a rotatable camshaft for actuating the cylinder valve and having a camshaft rotation axis, and a cam shifting system including a shifting unit rotatably fixed and axially moveable with respect to the camshaft, the shifting unit including at least two cams configured to be selectively brought in contact with a cam follower, each of the two cams having a base circle and a cam lobe, wherein the at least two cams have a common surface between the base circle and the cam lobe of each cam for providing an opening ramp to lift the cam follower, wherein the shifting unit is provided with at least one groove having a shifting portion, wherein the cam shifting system further includes a driving pin operable to selectively engage the shifting portion of the groove, the method comprising:
    rotating the camshaft;
    actuating the driving pin to engage the shifting portion of the groove for moving the shifting unit with respect to the camshaft along the camshaft rotation axis;
    wherein the cam follower engages at least a portion of the common surface during the movement of the shifting unit along the camshaft rotation axis.

8. The method according to claim 7, wherein during movement of the shifting unit along the camshaft rotation axis, the cam follower engages the at least two cams along a cam follower shifting path comprising at least a portion of the common surface, the cam follower shifting path being provided by the shifting portion of the groove extending on an arc.

9. The method according to claim 7, further comprising monitoring at least one value of at least one operating parameter of the internal combustion engine during operation, the at least one operating parameter comprising an engine load correlated parameter; the step of actuating the driving pin further to engage the shifting portion of the groove to move the shifting unit with respect to the camshaft along the camshaft rotation axis being carried out as a function of the monitored value of the at least one operating parameter.

10. A non-transitory computer readable medium comprising a computer-code, which when executed on a computer, is configured to perform the method according to claim 7.

11. A control apparatus for an internal combustion engine, comprising an electronic control unit, a data carrier associated to the electronic control unit and a computer-code, which when executed on the electronic control unit, is configured to perform the method according to claim 7.

12. A cam shifting system comprising:
    a rotatable camshaft rotatable about a camshaft rotation axis for actuating a cylinder valve;
    a shifting unit rotatably fixed and axially moveable with respect to the camshaft, the shifting unit having a circumferential groove with a rectilinear portion formed perpendicular to the camshaft rotation axis and a helical shifting portion defining a curved path extending between two points axially spaced on the shifting unit with respect to the camshaft rotation axis;
    a driving pin operable to selectively engage in the circumferential groove for axially positioning the shifting unit on the camshaft along the camshaft rotation axis between a first position to a second position;
    a cam assembly configured to contact the cam follower, the cam assembly including a first cam having a first base circle and a first cam lobe, a second cam having a second base circle and a second cam lobe and a common surface between the first and second base circles and the first and second cam lobes for providing an opening ramp to lift the cam follower; and wherein the helical shifting portion angularly extends around the shifting unit to define a cam follower shifting path which traverses at least a portion of the common surface when the shifting unit moves between the first and second positions.

\* \* \* \* \*